(12) United States Patent
Macy et al.

(10) Patent No.: US 8,117,103 B2
(45) Date of Patent: Feb. 14, 2012

(54) METHOD AND SYSTEMS FOR OPERATIONALIZING PROCESS EXCELLENCE

(75) Inventors: Barbara Macy, Charlotte, NC (US); Kenneth R. Dafforn, Charlotte, NC (US); Aline Young, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1739 days.

(21) Appl. No.: 11/161,139

(22) Filed: Jul. 25, 2005

(65) Prior Publication Data

US 2006/0100945 A1      May 11, 2006

Related U.S. Application Data

(60) Provisional application No. 60/522,817, filed on Nov. 10, 2004.

(51) Int. Cl.
*G06Q 40/00*         (2012.01)
(52) U.S. Cl. ......................................................... 705/35
(58) Field of Classification Search ..................... 705/35
See application file for complete search history.

(56) References Cited

U.S. PATENT DOCUMENTS

| | | | | |
|---|---|---|---|---|
| 6,308,162 | B1 * | 10/2001 | Ouimet et al. | 705/7 |
| 6,631,305 | B2 * | 10/2003 | Newmark | 700/110 |
| 6,735,596 | B2 * | 5/2004 | Corynen | 707/102 |
| 6,816,747 | B2 * | 11/2004 | Mammoser et al. | 700/109 |
| 7,006,878 | B2 * | 2/2006 | Schweizerhof et al. | 700/51 |
| 7,206,750 | B2 * | 4/2007 | Tsukishima et al. | 705/7 |
| 2002/0065709 | A1 * | 5/2002 | MacKenzie | 705/10 |
| 2003/0055696 | A1 * | 3/2003 | Tsukishima et al. | 705/7 |
| 2003/0167265 | A1 * | 9/2003 | Corynen | 707/4 |
| 2005/0033468 | A1 * | 2/2005 | Pate et al. | 700/110 |
| 2005/0177260 | A1 * | 8/2005 | Schweizerhof et al. | 700/97 |
| 2007/0078531 | A1 * | 4/2007 | Adra | 700/31 |

OTHER PUBLICATIONS

Visteon Creates Lean, Customer-Focused Manufacturing System. (Oct. 30). PR Newswire,1. Retrieved Nov. 20, 2011, from Business Dateline. (Document Id: 434025901).*

* cited by examiner

*Primary Examiner* — Hani M Kazimi
(74) *Attorney, Agent, or Firm* — Moore & Van Allen PLLC; James C. Edwards

(57) ABSTRACT

Method and systems for operationalizing process excellence. An execution methodology of the invention can meld process excellence with various tools and incorporate activity-based financial modeling, and an operating efficiency model. The overall process can be divided into sessions which can include pre-work, as well as characterizing "as-is" and "to-be" processes. The goal of the sessions is to create a continuous improvement productivity loop. The processes of the invention can be aided by apparatus including an instruction execution platform operable to store and execute computer program code instructions for implementing a plurality of the tools for use in characterizing the as-is and a to-be processes. One or more of these tools can be implemented in the form of a spreadsheet. A data store can be operatively connected to the instruction execution platform by a network to supply historical data and store results.

18 Claims, 11 Drawing Sheets

FIG. 3A

Cost of Poor Process AS-IS Worksheet

Process Description:        Prepared By:

| Value Added | Process Steps | Average Hours per Task | Average Rate | Time Leveled | FTE By Step | FTE Cost of Step | NVA | COPQ Target % | Total Cost of Poor Business Process | Total Cost for this Step |
|---|---|---|---|---|---|---|---|---|---|---|
| 1 ☐ | | | | | | | | | | |
| 2 ☐ | | | | | | | | | | |
| 3 ☐ | | | | | | | | | | |
| 4 ☐ | | | | | | | | | | |
| 5 ☐ | | | | | | | | | | |
| 308 | 316 | 318 | 322 | 312 | 324 | 326 | 328 | 330 | 334 |

310 — 304 — 306 — 300

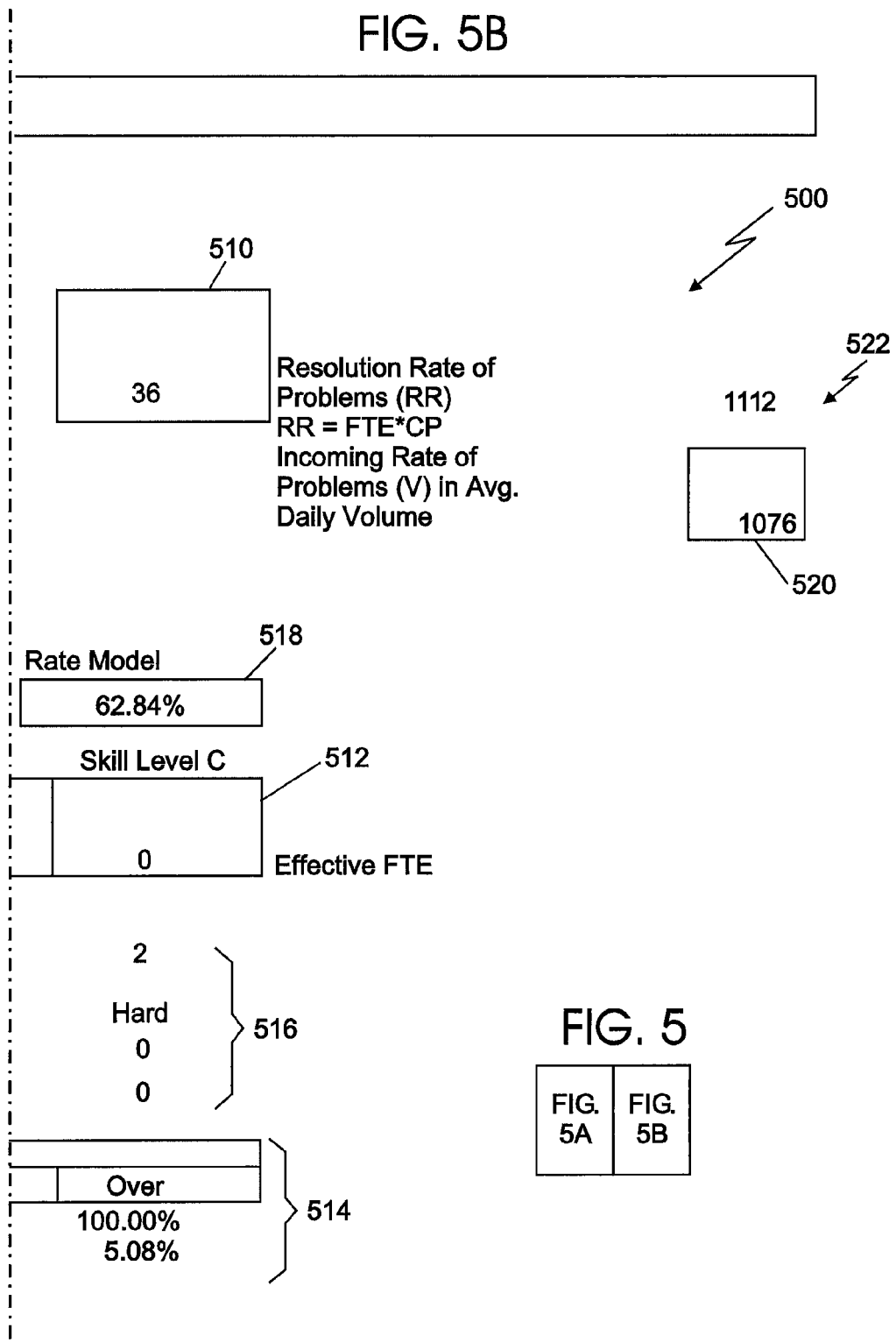

METHOD AND SYSTEMS FOR OPERATIONALIZING PROCESS EXCELLENCE

CROSS-REFERENCE TO RELATED APPLICATIONS

This application claims priority from provisional patent application Ser. No. 60/522,817 filed Nov. 10, 2004, the entire disclosure of which is incorporated herein by reference.

Much of what is disclosed in this application is also disclosed in commonly owned applications: Ser. No. 10/905,254, filed Dec. 22, 2004; Ser. No. 10/908,925, filed Jun. 1, 2005; and Ser. No. 11/160,935, filed Jul. 15, 2005, the entire disclosures of which is incorporated herein by reference.

CROSS-REFERENCE TO COMPUTER PROGRAM LISTING APPENDIX

A portion of the present disclosure is contained in a computer program listing appendix. The appendix contains an MS-DOS file entitled TL.txt created on Jul. 23, 2005, of approximately 18 kilobytes. The contents of this file are incorporated herein by reference. Any references to "the appendix" or the like in this specification refer to this file. The contents of this file are subject to copyright protection. The copyright owner has no objection to the reproduction by anyone of the patent document or the appendix as it appears in the Patent and Trademark Office patent files or records, but does not waive any other copyright rights by virtue of this patent application.

BACKGROUND

Understanding how to execute a business process within a company or enterprise in order to maximize revenue, profit, or other metrics, is of enormous importance and has a significant impact on the company's success in the marketplace. Ideally therefore, business processes should be monitored, modeled, and optimized in much the same ways as scientific or manufacturing processes. Thus, the same management tools and methodologies as typically applied to manufacturing processes, for example six sigma and "lean" management techniques, can and should be applied to business processes.

Six sigma is a rigorous and disciplined methodology that uses data and statistical or statistics-like analysis to improve operational performance. The term "sigma" refers a statistical expression of numbers defects per numbers opportunities, with "six sigma" corresponding to 3.4 defects per million. "Lean" is a term used to refer to techniques originally developed in the automobile industry to improve manufacturing performance. Lean and six sigma methodologies can be applied together.

When a business process is being analyzed using either a six sigma or a lean technique (or both) the faster the analysis can be accomplished with accuracy, the sooner the enterprise can reap the benefits. Thus, tools and methods to make the six sigma, lean, or other process being used to improve or operationalize excellence of the business process can be important.

SUMMARY

Embodiments of the present invention can provide a method and system to enable the operationalizing of process excellence. An execution methodology of the invention can meld process excellence with various tools and incorporate activity-based financial modeling, and in at least some embodiments, an operating efficiency model. The overall process can be divided into sessions which can include prework, as well as characterizing "as-is" and "to-be" processes. The goal of the sessions is to create a continuous improvement productivity loop.

In some embodiments, a system to facilitate operationalizing process excellence according to the invention can include define measure and control (DMC) activities, management by fact (MBF) activities and a plurality of lean tools. Financial analysis produced at least in part by the lean tools, can include a business case, hard costs, and predictive impacts linked to primary metrics. Project execution can be linked to the MBF activities so that a continuous improvement productivity loop is formed.

In some embodiments, a method of the invention can include team assembly and pre-work. The method can further include characterizing an as-is process using at least one of the plurality of lean tools, and characterizing a to-be process to provide comparative evaluation of the to-be process relative to the as-is process. The method can further include executing implementation and control activities based on the characterizing of the as-is and to-be processes to create a continuous improvement productivity loop. A wide variety of tools can be used to facilitate the processes of the invention. These tools can include, for example, an employee opinion survey, a skills matrix, a cost-of-poor-process (COPPO) tool; a takt-o-meter, an operating efficiency model, and others.

In some embodiments, the processes of the invention can be aided by apparatus including an instruction execution platform operable to store and execute computer program code instructions for implementing a plurality of the tools for use in characterizing the as-is and a to-be processes. One or more of these tools can be implemented in the form of a spreadsheet. A data store can be operatively connected to the instruction execution platform by a network to supply historical data and store results.

BRIEF DESCRIPTION OF THE DRAWINGS

FIG. 3 is presented on two sheets, as FIG. 3A and FIG. 3B.

FIG. 5 is split into FIGS. 5A and 5B for clarity.

DETAILED DESCRIPTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, steps, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

Figure 1:
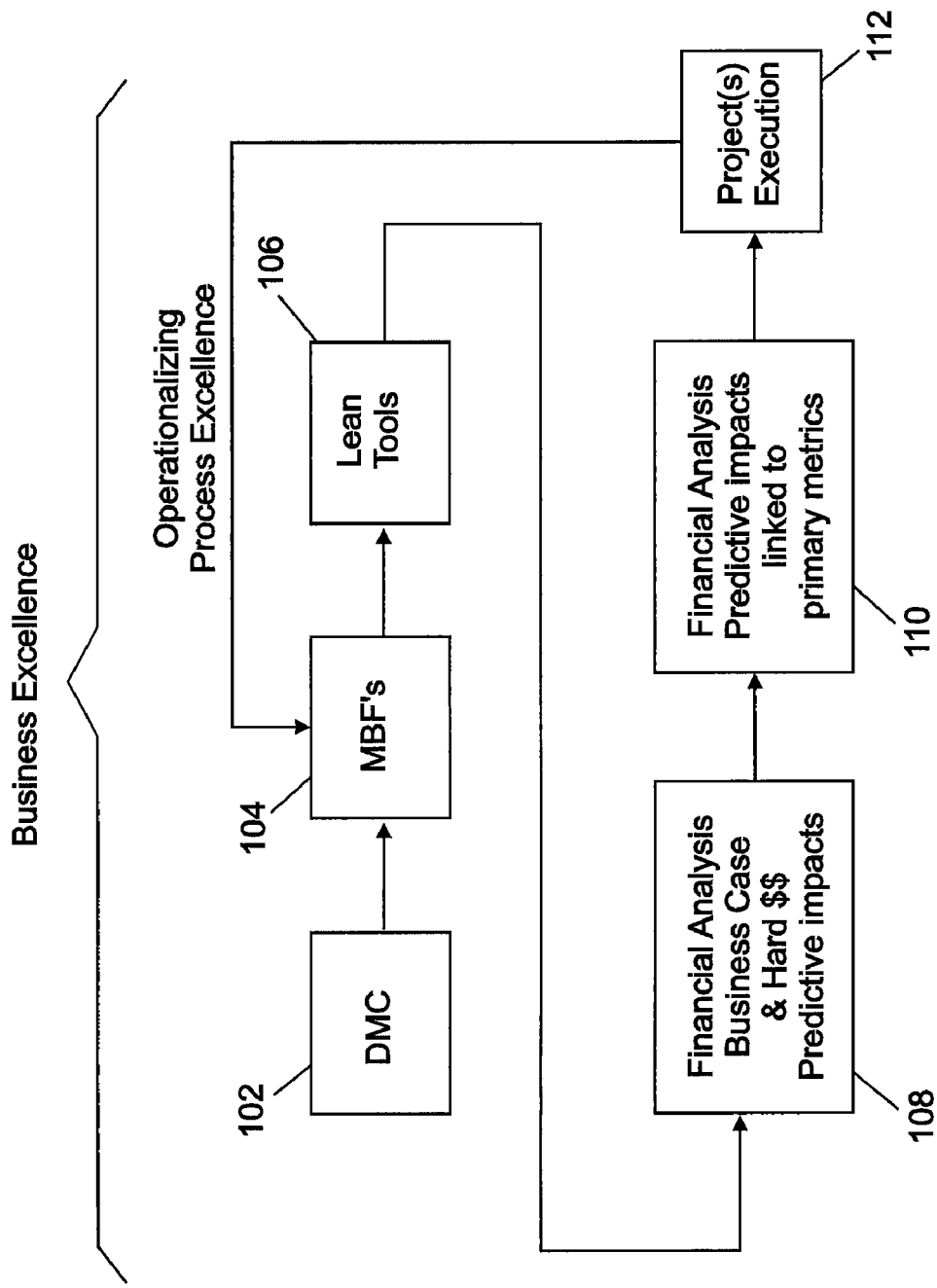
FIG. 1 is a block diagram of an overall system that promotes business excellence, in part through operationalizing process excellence.

FIG. 1 illustrates the operating environment of the invention as a system of related activities represented by system blocks. These activities can be carried out to some extent in parallel and there may be overlap between the activities. The system can be used to enable or operationalize process excellence and may include varying numbers of tools as a part of the process. Portions of the process may be referred to herein as "turbolean." Turbolean can be a 30 to 90 day execution methodology that melds process excellence with six sigma tools and lean tools (which together may be referred to herein as "lean" tools), and may include activity-based financial tools along with an operational efficiency model, to create a continuous improvement productivity loop. The example system of FIG. 1 includes define, measure, and control (DMC) activities 102, and management by fact activities (MBF's) 104.

In block 106 of FIG. 1, lean tools, and possibly other tools are used to produce financial analysis including a business case and hard-cost-related, predictive impacts, as shown at block 108. Subsequently, a financial analysis that includes predictive impacts linked to primary metrics is produced at block 110. Project execution 112 can then be undertaken, which is managed by fact at block 104. This implementation and control can produce a feedback loop that operationalizes process excellence, within an overall system of business excellence system.

Figure 2:
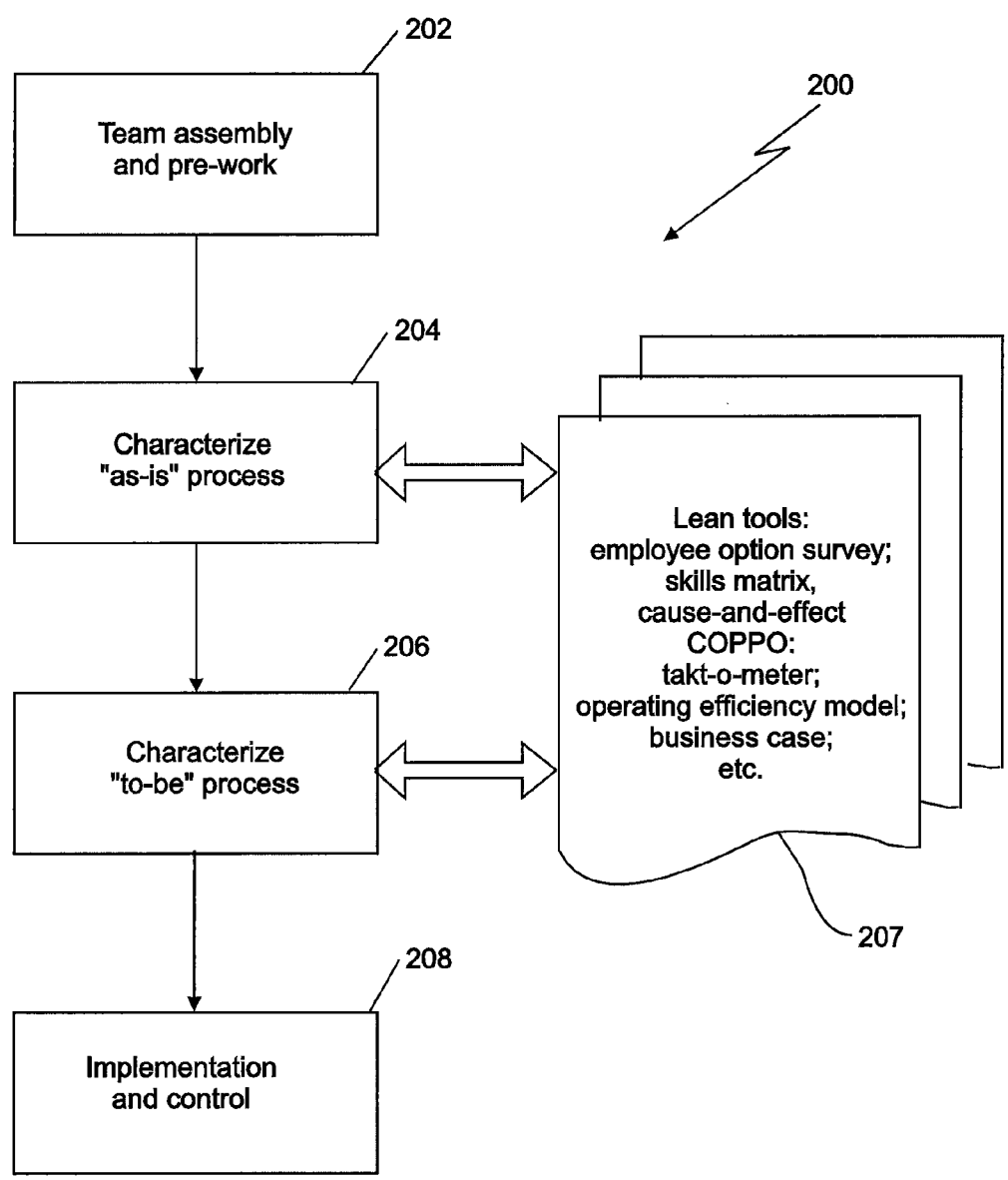
FIG. 2 is a flowchart that illustrates a portion of a method of using lean tools according to embodiments of the invention to operationalize process excellence.

FIG. 2 describes how the tools used in the system of FIG. 1 are applied to produce the analysis and implement process improvement. As opposed to the system view of FIG. 1, FIG. 2 is a process view presented in flowchart form, as a series of process blocks. Process 200 of FIG. 2 includes team assembly and pre-work as shown at block 202. Pre-work sessions in some embodiments are those in which products' or services' evolution can be examined and opportunities to reduce completion time, improve delivery time to customers and reduce overall costs can be identified. Tools can be used to characterize an end-to-end flow of the product through the business process. These tools can include kick-off information meeting materials and team member lists. A kick-off meeting can provide an open forum to address questions to the members with respect to the process early so the members are more productive during the team sessions. A performance plan can be developed that incorporates current and future processes and a recommended timeline for tracking the project. The tools used early in pre-work call sessions can include an assessment tool and a performance plan tool, for example, as well as Hoshin planning or other closed-loop performance plan tools to provide a baseline and a progression check of metrics for initiatives. A lean work plan and the member contact list can also be used in the pre-work sessions to document the project tasks, the lean team member(s) assigned a particular task, and task start and completion dates.

In the example of FIG. 2, the as-is process can be characterized at block 204 by determining the impact of changes on the process and on employee views through developing an as-is process map, including a time vs. waste view of the business process. Additional tools used can include a management plan, skills matrix, a "voice-of-the-associate" (VOA) survey (employee opinion survey), and a work plan. The work plan can help identify the stakeholders, their reaction to the changes and potential risks. The skills matrix identifies the strengths and weaknesses of team members by ascertaining the gaps to skills needed to complete the project.

A multi-generational plan can be established. The first generation of the plan can set out tasks for vision, process generations, technologies, scope, governance and metrics for tracking project success. The first generation plan can also set out a generation task timeline. To determine the voice-of-the associate, a survey can be prepared to determine what works, what doesn't work, what should be changed, and a positive and a negative that would impact the product or service or the use of it.

Process maps can be created to assist in characterizing the as-is process. Data can be collected from on-site interviews of the associates (employees) and directly used to build an overall as-is process map and other types of process maps. A spaghetti map can also be constructed that illustrates the environment of the as-is process. Additionally, causes and effects can be analyzed and described as part of the as-is process using such tools as a cause-and-effect fishbone diagram and a cause-and-effect matrix built from the fishbone. Additionally, waste can be described and characterized, and quantified based on observed timings and Muda costing.

An additional tool that can be used early in team sessions at block 204 of FIG. 2 is the "cost-of-poor-process-opportunity" (COPPO) tool, which captures and identifies the cost per process step. In example embodiments, this tool can be implemented with a Microsoft Excel™ spreadsheet running a visual basic macro. The same type of spreadsheet can be used later to identify future COPPO or the COPPO in the "to-be" process. Source code for visual basic macros to provide a COPPO spreadsheet for both the as-is and to-be processes in tabs (along with other tools) is contained in the appendix and is listed first.

Later, possibly in team sessions, the to-be process can be characterized as shown at block 206 of FIG. 2. Thus, comparative evaluation of the as-is and to-be processes can be provided relative to a number of measurements. Various tools such as a project prioritization by risk/reward and a baseline tree metric can be used along with process flows, some of which are updated from the analysis of the as-is process. For example, the VOA can be used, as well as an activity of the product analysis, an activity of the associate analysis, and an activity of the equipment analysis. Such analysis tools can include a process flows and time value maps. An activity of the equipment (AOE) analysis can include determining operating equipment efficiency and developing an associated efficiency log, and an AOE spaghetti map. One tool that can be used to determine a future or to-be state is an analysis to identify, and then convert or eliminate (ICE) waste. Sources of waste are analyzed, and financial analysis can be performed. A takt time calculator, which can also be referred to as a takt-o-meter or takt-o-meter tool, can be used to determine the pace of production needed to produce a unit to meet customer demand requirements at a level necessary to drive the to-be state or optimize the as-is state. Source code for an example embodiment of the takt-o-meter is listed in the appendix as the second block of code. As illustrated in FIG. 2, lean tools 207 can include many tools and the lean tools generally interact with the characterization of the as-is and to-be processes, although not every tool is used in both.

In the operating environment of the invention, as described by FIGS. 1 and 2, a new process design and product flow can be delineated, along with any exception flows necessitated. Standard work is described so that an associate can be trained. Strategies and assessments can be completed, and can include monument identification, and a so-called "5S" assessment, which focuses on workplace layout and cleanliness. In addition, as part of the to-be process characterization of FIG. 2, an operating efficiency analysis is done through an operating efficiency model providing complexity and skill level scenarios for various staffing and inventory levels against a primary metric that is variable by engagement. One example of the operating efficiency model is implemented via a spreadsheet running a visual basic script. Example visual basic source code is included in the appendix, and an example operating efficiency unresolved rate impact model is described in this description with reference to FIGS. 5 and 6.

Material inputs for the business process can be identified along with an internal replenishment plan or "Kanban" strategy. Perishable supplies can also be described and supported with Kanban calculations. Cost analysis can be performed for the to-be process, and a business case proof of concept tool can be used to identify cost-per-step in the to-be process compared to costs in the former as-is process, the savings opportunity, and the initiatives needed to capture the opportunity in the new process. Another tool, a critical-to-business results analysis can be used to compare the business value determined for each initiative coming out of the to-be process against its ease of implementation. The business case proof of concept tool can be implemented as a spreadsheet running a visual basic script. An example visual basic source code listing for a multi-tabbed spreadsheet file that includes as-is and to-be COPPO tool worksheets as well as an example business case proof of concept tool worksheet. An operational risk assessment can be done to assess potential risk for the proposed initiatives.

As shown at block 208 of FIG. 2, a deployment/implementation and control plan can be created and executed after the as-is and to-be processes or "states" have been characterized and analyzed. Final metrics are defined and linked to the initiatives being piloted. A final operating efficiency matrix can also be used to model pilot results. A plan for visually displaying and updating these metrics is also put in place. New roles and responsibilities are defined, standard work definitions are developed and a scheduling system can be refined and/or created. A final or additional to-be takt and staffing calculation can be performed and institutionalized. Typically, ongoing training and support plans are also put in place. As part of the control plan, the multi-generational plan previously discussed can be updated or created. In addition a "Kaizen" strategy, audit routine, and workflow policies and procedures can be created and implemented. After the above is completed the new process is fully implemented and results including lessons learned are captured. A plan can then be put in place to transition to a new process, possibly including new or newly certified personnel.

Figures 3, 3B:
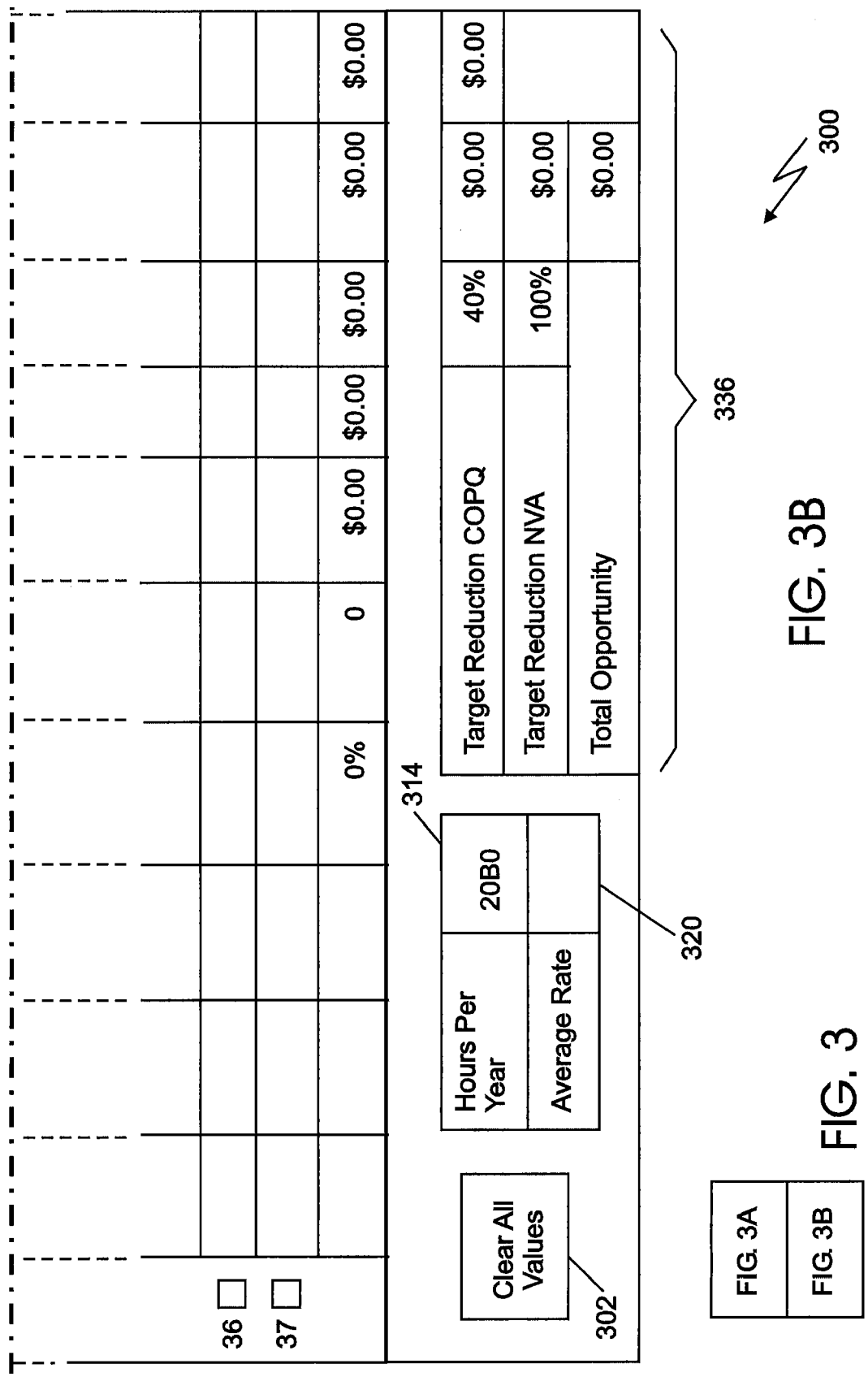
FIG. 3 is a screenshot of a COPPO input and output screen that can be used with some embodiments of the present invention.

FIG. 3 is a screenshot, 300, of a tool that can be used to calculate COPPO with some embodiments of the invention. FIG. 3 is presented on two drawings sheets as FIG. 3A and FIG. 3B. The spreadsheet implementation of the tool, as illustrated in FIG. 3 is for the "as-is" COPPO, however, the "to-be" COPPO can be calculated by using another, similar sheet. The appendix to this application includes visual basic source code for a spreadsheet implementation of such an embodiment. A walk-through of screenshot 300 of FIG. 3 provides a good vehicle to explain how COPPO and other information can be determined for a plurality of steps or tasks in an activity.

Button 302 in the lower left hand clears all previous inputs, and lets the user start with a new calculation. Field 304 can be filled in with a process description and field 306 can be filled in with the name of the person completing the model. The model is built from a description of the steps of the people working in the activity based on their individual performance within process. A process map, flowchart or physical description of the process can be used. Each task of that description can be isolated and can become one of the steps. The steps are listed in column 308 of screenshot 300 of FIG. 3. The number of steps/tasks can be determined by describing the process, for example, using an interviewing technique.

Check boxes 310 are used to indicate whether a step is value-added, meaning that the step produces something of value to a customer of the process. In at least some embodiments, value-added steps can be considered those steps for which a customer of the process or activity will pay.

Column 312 of screenshot 300 is for the input of "FTE by step" for each of the steps in the activity. To determine FTE by step, the number of full time equivalent employees performing that step over the period of the year, or comparable accounting period is determined. That total can be divided by the total number of minutes being utilized by a single FTE, to obtain the FTE by step. For activities that take a small amount of time, the FTE by step is generally a fractional number, unless there are a large number of employees (associates) working on the activity.

It should be noted that the step names, FTE by step, and the other descriptive information mentioned so far with respect to FIG. 3 are, in at least some embodiments, the only information which is input to the COPPO tool by a normal user. In such an embodiment, other fields can be pre-populated by a person who supervises the COPPO process, or are calculated, as can be readily appreciated by a person who examines the appendix.

Still referring to FIG. 3, the total number of FTE per step accumulates at the bottom of the column and equates to the total number of FTE allocated to that particular business entity performing that process or activity, taking into account the standard number of hours worked a year by a full time employee. In this example embodiment, that number of hours is shown in field 314, and is 2080 hours per year.

Column 316 of FIG. 3 shows the average hours per task, which is the result of the number of FTE employees times the time spent doing a particular process step. That column should cumulatively total to the average hours per year, in this example 2080 hours. Column 318 is the average rate for an employee performing the task. If an overall average rate is input in block 320, that value is used. However, in processes where employees of different rates are used for different tasks, the appropriate blocks in the model can be adjusted when deemed necessary. Time leveled column 322 takes the individual activities and apportions them across 100%. This apportionment can provide a perspective of which particular activities are absorbing the most time in the process. Additionally, in this example embodiment, time leveling force balances to 2080 hours.

Column 324 of screenshot 300 of FIG. 3 lists the FTE cost per step, which refers to the total amount of cost for the FTE that is applied to that process step. In this example embodiment, that value is the number of FTE employees times the average hours per task times the average fully burdened rate. Fixed costs like occupancy and telecommunications are not usually assigned per individual but are assigned to an entity enterprise; however, these costs could be included in the burdened rate if desired.

Still referring to FIG. 3, column 326, labeled "NVA" refers to the portion of the activity cost in each case that is non-value added. Those tasks that are checked at boxes 310 have value added direct cost. In this example embodiment, if a task is not checked, the task is deemed "non-value added," and 100% of the cost in that process step will also be non-value added. In such a case the FTE cost per step is the same as the non-value added cost. Column 328 shows the cost of poor quality (COPQ) target percentage for each task, which refers to the particular component of cost in a value-added activity, which in fact is non-value added. If one delineates each value-added process step, and breaks it down to a lower level, one would find that it usually has multiple steps within it, some of which add value, and some of which add no value. In general a percentage between 20% and 40% is allocated to this non-value added component of the identified value-added step or task. It should be noted that 40% has been found to be a good benchmark for COPQ. Thus, in the case of a non-value-added step, the total cost of the task becomes the total cost of poor business process for the step in column 330. For a value-added step, the FTE cost per step is multiplied by the COPQ, in this example 40% as input at field 332, and the result is total cost of poor business process. These amounts again total at the bottom of the column. Note that the total cost for each task is calculated and shown in column 334. Also note that in the screenshot of FIG. 3, total opportunity costs and the total process cost for all activities are again summarized near the bottom right of the spreadsheet display in area 336.

Figure 4:
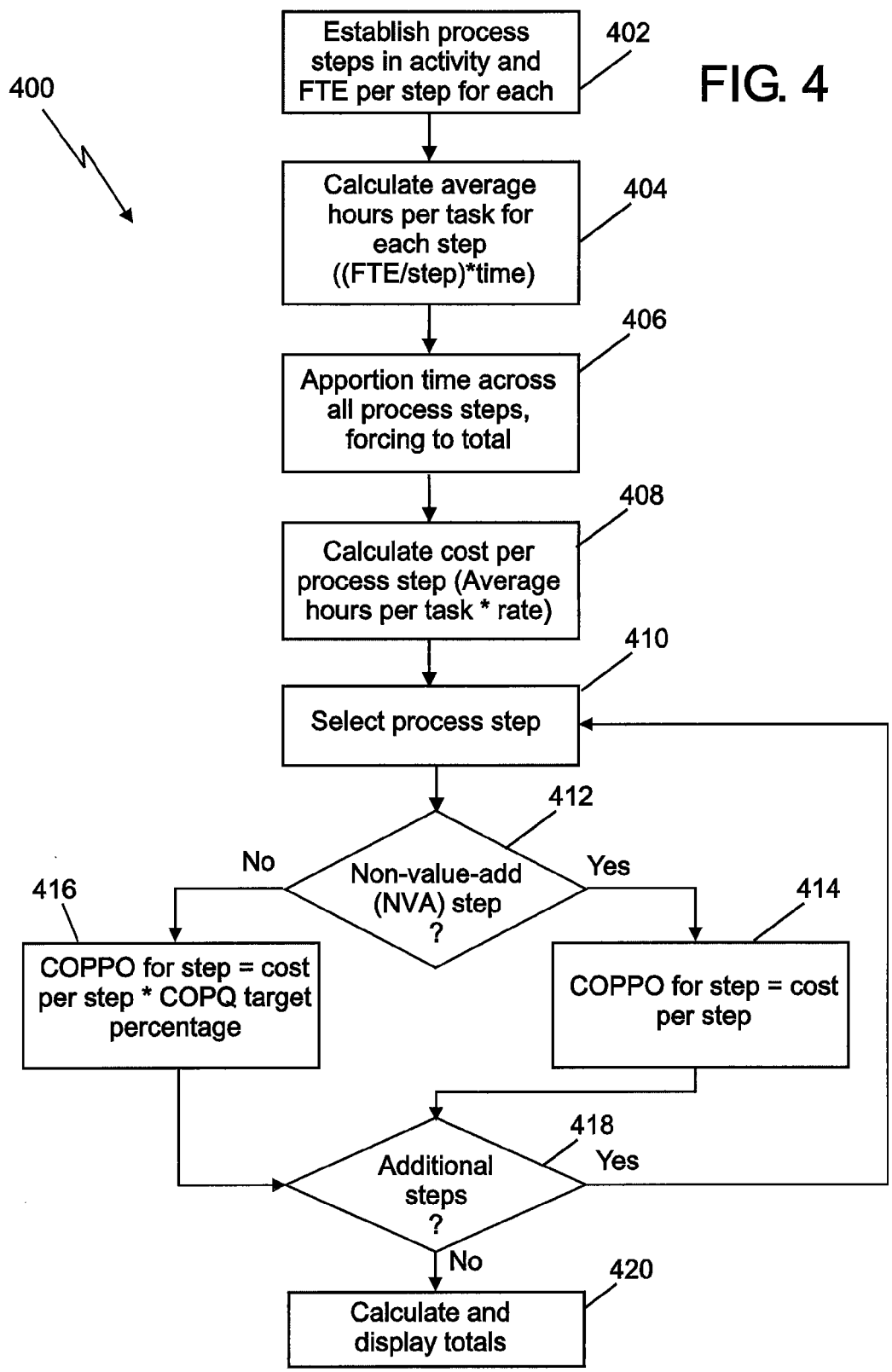
FIG. 4 is a flowchart showing some of the calculations performed in doing a COPPO evaluation according to at least some example embodiments of the present invention.

FIG. 4 shows the COPPO calculations in flowchart form. Process 400 consists, in this example, of a series of sub-process blocks, as is typical of most flowchart illustrations. At block 402, the process steps or tasks in the activity being evaluated are established. In computerized implementations of process 400, this can be accomplished via user input, or by pulling the information from a data store. At block 404, the average hours per task is calculated by multiplying the number of full time equivalent employees on the step by the time taken. At block 406 in this embodiment, the time is apportioned across all steps, forcing the cumulative time to the total time allotted in an accounting period, for example, a calendar year. At block 408, the cost per process step is calculated by multiplying the average hours per task times the burdened rate for an FTE.

Still referring to FIG. 4, each process step is handled by independent calculations beginning at block 410. At block 412, a determination is made as to whether a step is a non-value-added (NVA) step. In at least some embodiments, this determination is made through user input. For example, in the embodiment shown in FIG. 3 and in the appendix, a step is treated as an NVA step when the user does not check the appropriate box. If a step is an NVA step, the COPPO for the step is set to the cost for the step at block 414. Otherwise, the COPPO for the step is set to the cost per step times the COPQ target percentage at block 416. If there are additional steps at block 418, the NVA determination and calculation is repeated. Totals are calculated and displayed at block 420. Although this totaling appears graphically after the other process blocks in FIG. 4, it actually occurs continuously in the example embodiments presented herein.

Figure 5A:
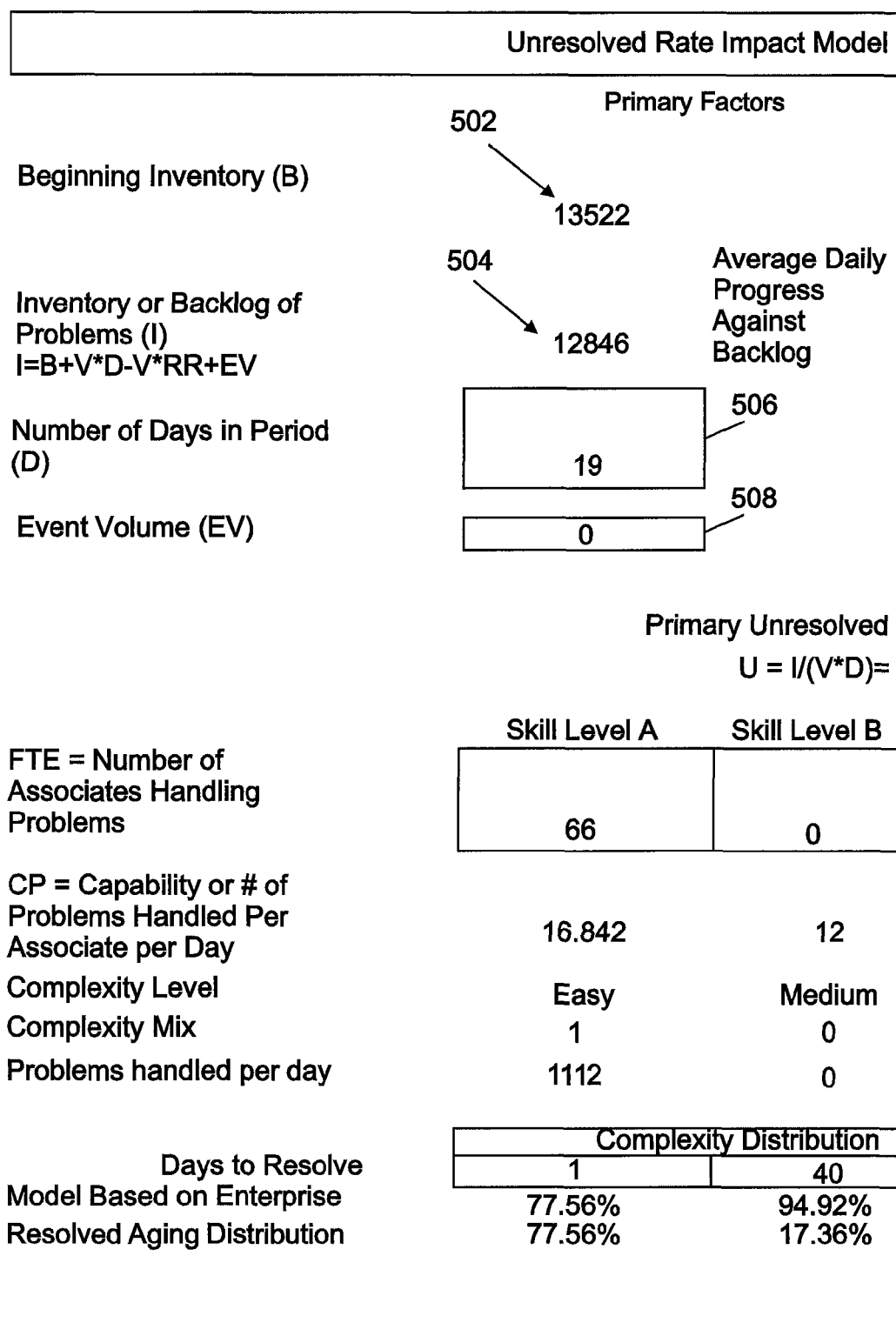
FIG. 5 is a screenshot of an input/output screen for an unresolved rate impact model (URIM) tool used with some example embodiments of the invention.

FIG. 5 is an example screen shot of a user screen, 500, for a software implementation of the operating efficiency model tool discussed above. This tool is designed to provide an operational efficiency model based on unresolved rate impact to work on any problem in a transaction-oriented production environment. In this example, the tool is implemented by a visual basic script running within a version of Microsoft Excel™. The primary metric in this embodiment is the unresolved rate. Field 502 is a beginning inventory (B), which represents the amount of work that exists in the time period being considered. This field may be populated by the user when the tool is being run, or may be pulled from a data store. The example shows 13,522 cases, which is the number problems that exist in a particular area on a particular day that modeling is to begin. Field 504 of FIG. 5 represents the ending inventory, backlog (I) or the outcome at the end of the model period, i.e. after the model simulation has been run. This field is typically calculated. An example formula is shown in screen 500 to the left of field 504 and the calculation with be discussed in more detail with respect to the flowchart of FIG. 4.

Still referring to FIG. 5, field 506 is the number of days in the pre-selected time period being modeled. In many cases a time period of a month is chosen and in most months in businesses that operate on a 5-day work week the number of workdays available is between 19 and 22, with exceptions between 18 and 23 workdays. For this example 19 days has been input by a user.

Field 508 of FIG. 5 is an input called "event volume" that can be used to represent any kind of unusual activity that brings additional inventory or additional work into the process. For example, if a sales pitch might offer a special to a market so that another 1,000 work items came in at once or in a relatively short period of time, the number 1,000 would be entered. This would increase the beginning inventory and also increase the amount of work that needs to be done in that month to reach equilibrium. In many cases the event volume is zero, so zero is used in the example of FIG. 5.

Field 510 of FIG. 5 is another calculated item. The calculation will again be discussed with respect to FIG. 4. An equilibrium state is reached when an organization is working every period so that it's progressing to produce in output the same number of items or problems as received in input. For instance if 500 transactions are received in a day and 500 were processed, a state of equilibrium would exist because the input would equal output. If only 600 items were processed, and 500 items were input, there would be a negative progress against backlog, and inventory would grow by 100 transactions a day. Field 510 in this example (as can be appreciated from the code in the appendix) is conditionally formatted to turn red if progress is not being made. In the particular example, it shows 36 cases of progress against the backlog in a day. Backlog is being decreased at the rate of 36 items per day. If work continued at this same rate, the inventory would slowly dwindle down to zero.

Still referring to FIG. 5, fields 512 represent skill levels of associates (employees) available to handle work items in the enterprise. In this example, three skill levels are delineated "A", "B", and "C", representing average skill levels for the employees in each group as determined by the supervisors or managers managing the group working the process. This is an example only, and the tool can be changed to accommodate any number of skill levels, or only one. The input for these fields is a number of effective full time employees (FTE's) and may be supplied by the user or pulled from a data store. A skills assessment or another type of performance assessment can be used to make this determination. This feature can help determine which kind of resources to apply to which problems or cases coming into the workflow process. For example, if people with the greatest skill perform the easiest tasks, and people with the lowest level of skill perform the hardest tasks, a larger backlog of problems or cases to resolve can result. In a typical use of the tool, the employees assigned to the tasks can be scaled based on the complexity distribution fields, 514, shown near the bottom of screen 500 and discussed below. This can be accomplished manually, or the tool could be enhanced to make recommendations based on the complexity distribution. Complexity distribution fields 514 in this example distribute problems into three groups based on "Days to Resolve" which are input by the user. The "Model Based on Enterprise" line is a cumulative distribution, in this example showing the percentage of problems solved or items handled in one day or less, 40 days or less, and over 40 days (or less). The "Resolved Aging Distribution" line is a non-cumulative distribution showing the number of problems in each category. These numbers can be calculated in the standard way based on stored data for each problem (date in vs. date out) or can be input manually.

Complexity level fields 516 combine the capability (CP=average number of problems handled per day per associate) for associates in each skill level with the actual number of associates to determine the problems handled per day, or the problem resolution rate for a given skill level. Combining the numbers of problems being assigned to each skill level with the capability for the skill level can also aid in determining the length of time to put in the "Days to Resolve" fields for the complexity distribution. In this particular example, although only associates in the lower skill level are available, it has been learned that easy problems are solved in one day or less, harder problems, needing extra research, can take up to 40 days, and the hardest problems can take longer. The medium problems represented over 17% of the workload in this example. The very complex problems represent over 5% of this workload. This distribution can indicate how to allocate the employees available, and also what kinds of skills are needed.

Still referring to FIG. 5, filed 518 displays the calculated, "unresolved rate of problems" primary metric. This metric in this example is essentially the inventory or backlog of problems divided by the volume of cases multiplied by the number of days' volume. Other equations could be used to compute the volume in this field. In this particular example, the primary metric is 62.84%, and this metric reflects process capability because it shows how the outstanding rate (output) compares to the incoming rate (input). A change in capacity would normally cause this metric to change.

Field 520 of FIG. 5 displays the incoming rate of problems (V) occurring on a daily basis. The rate of resolution (RR) shown in field 522 is the rate that problems are actually handled during a particular period of time with the skilled set of labor that is available. In this example 1,112 cases per day are being resolved. This average value is a computed by summing the problem resolution rates for each skill level. In this case, since the resolution rates for two of the skill levels is zero, the total resolution rate is the same as the resolution rate for associates in skill level "A." If 1,112 cases are being resolved daily, and the incoming rate is 1,076, the difference between these two values is 36, indicating the progress per day that is reducing inventory or backlog, as shown in field 510, previously discussed. This is a daily factor.

Figure 6:
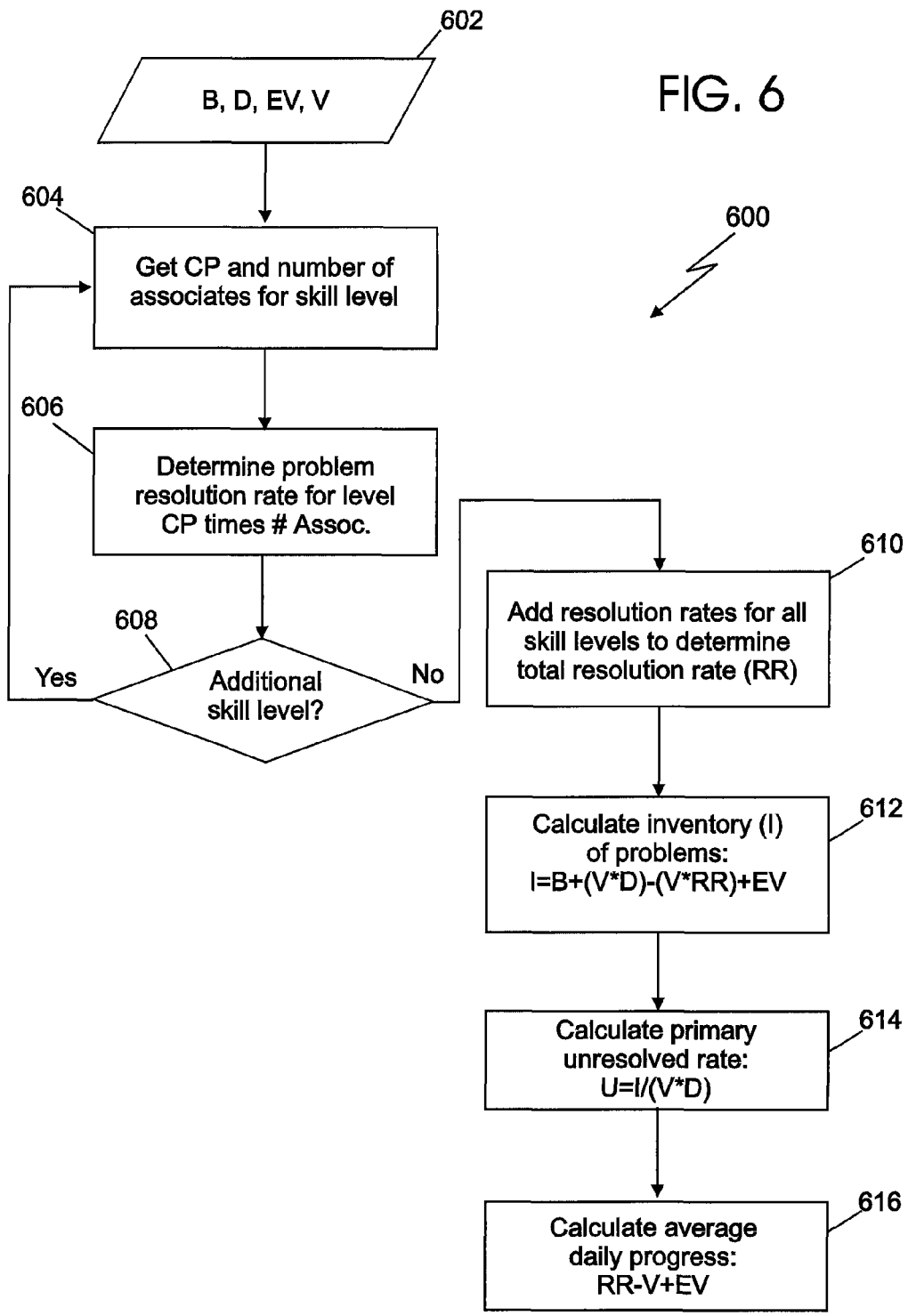
FIG. 6 is a flowchart that illustrates the operation of the URIM tool according to example embodiments of the invention.

FIG. 6 illustrates an example process, 600, for an example unresolved rate impact model tool according to an example embodiment of the invention like that shown in FIG. 5. FIG. 6 is a flowchart illustration. As is typical with a flowchart illustration, sub-processes, elements, or steps are illustrated as a series of process blocks. Block 602 represents the input, in this example, the beginning inventor (B), the number of days in the time period (D), the event volume (EV) and the average daily rate of incoming problems (V). At blocks 604 and 606, the average capability of the employees in each skill level and the number of employees are retrieved (either from a data store or from user input) and multiplied to obtain the problem resolution rate for each skill level. Once these calculations are complete at block 608, the resolution rates for all skill levels are added together at block 610 to obtain a total resolution rate (RR) for problems given the resources available.

Still referring to FIG. 6, the inventory or backlog (I) of problems is calculated at block 612 using the formula shown. The primary unresolved rate metric is calculated at block 614 and the average daily progress is calculated at block 616, as previously discussed. Note that the complexity distribution calculations are not shown in FIG. 6 for clarity; however, these calculations take place in parallel with the calculations shown and simply use in and out dates for problems solved in the enterprise.

The last block of source code listed in the source code appendix is visual basic source for operating efficiency modeling using an unresolved rate impact model according to an example embodiment of the invention. The input screen generated by this code is similar to what was illustrated in FIG. 5 and discussed with respect thereto. It should be noted that this code is conceptual in nature, and the embodiment here may not necessarily match all aspects of the embodiment shown in FIGS. 5 and 6.

Figure 7:
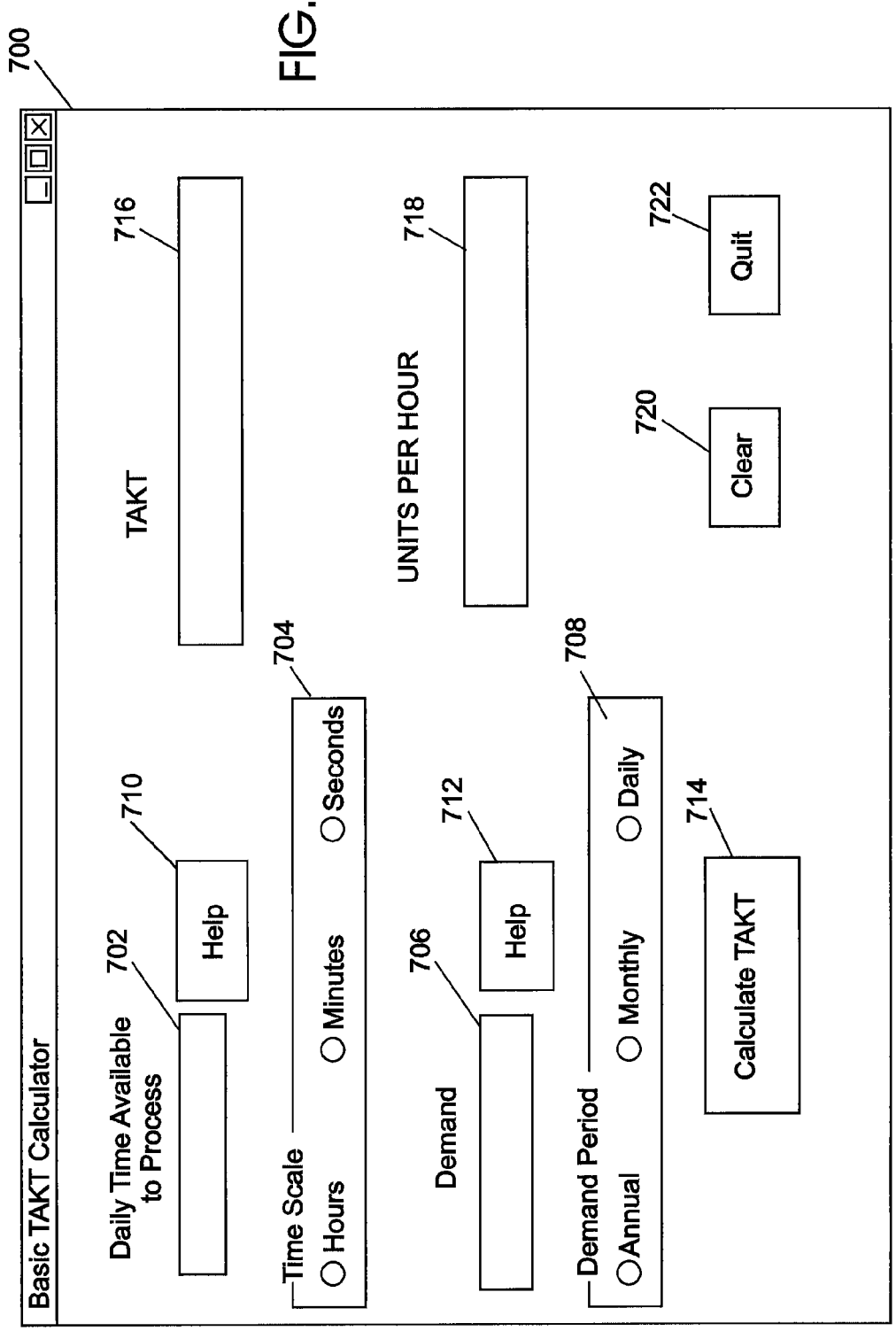
FIG. 7 is a screenshot of an input/output screen for a takt time calculator that can be used with at least some example embodiments of the invention.

FIG. 7 is an example screen shot of a user screen, 700, for a software implementation of the takt calculator discussed above according to example embodiment of the invention. In this particular example, a daily time available for the business process in question is input in box 702. A time scale for this daily time is selected using radio buttons 704. A demand in terms of number of units of output is input at box 706. A time scale for the demand, which might be termed the demand period, is input using radio buttons 708. Note that the time scale for radio buttons 704 is either hours, minutes, or seconds. The time scale for radio buttons 708 is either annual, monthly, or daily. Other time scale options can be made available as needed for the types of processes being analyzed. Context sensitive help is provided by clicking button 710 in the case of the daily time available, and clicking button 712 in the case of the demand.

The takt calculator which maintains screen 700 will perform calculations using the input supplied when button 714 is pressed or clicked. Once the calculations are complete, in this example embodiment, the takt is displayed in display box 716. The number of units per hour which will be required based on the calculated takt and the inputs is displayed in display box 718. A clear button, 720, is provided to clear all input and output fields and set the calculator up for another calculation. In addition, quit button 722 exits the calculator application and returns to the operating system. In this example embodiment, the calculator is implemented in basic running within the Microsoft Windows™ operating system, as evidenced by the standard Windows frame controls.

Figure 8:
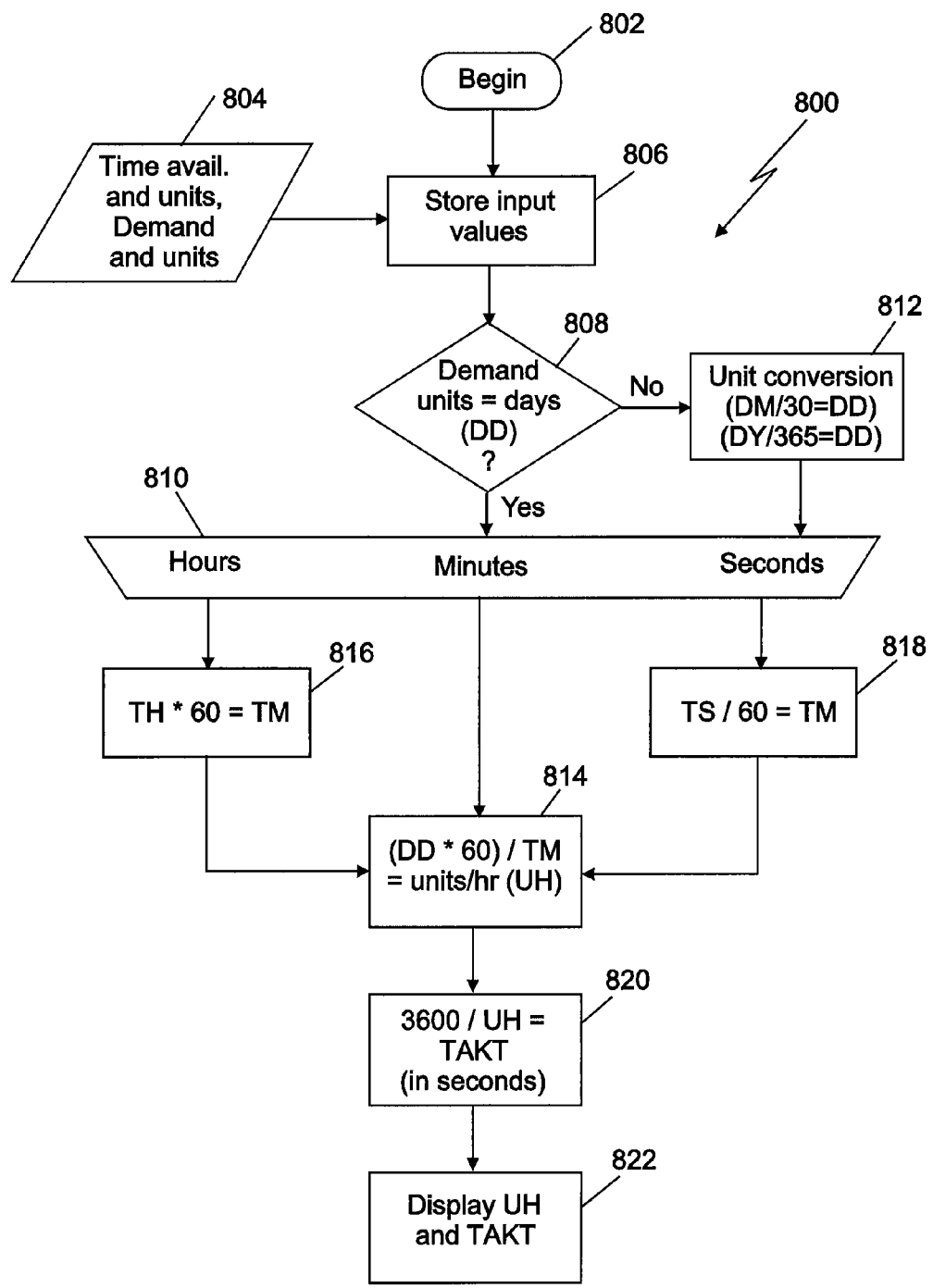
FIG. 8 is a flowchart that illustrates the operation of the takt time calculator according to example embodiments of the invention.

FIG. 8 illustrates an example process, 800, for a takt calculator application according to an example embodiment of the invention. FIG. 8 is a flowchart illustration. As is typical with a flowchart illustrations, sub-processes, elements, or steps are illustrated as a series of process blocks. Process 800 begins at block 802 when a user presses a calculate button. Inputs 804 are stored at block 806. These inputs, as previously discussed, include a time available, a demand, and possibly units for each. It can be assumed for purposes of this example embodiment that calculations are to be performed with time available expressed in minutes (TM) and with demand expressed in demand for units per day (DD). It should be noted that there are numerous ways to architect an application of this type, and units can be handled in many different ways. Returning to the example of FIG. 4, if the demand units are in days at decision block 808, processing proceeds to tri-partite decision block 810. Otherwise, a unit conversion for the demand is carried out at block 812. If the demand is expressed in units per month, that value is divided by 30 to obtain demand in terms of units per day. Likewise, if the demand is expressed on an annual basis, that value is divided by 365 to obtain units per day.

The units of the time available input are handled at block 810. If the units are already in minutes, processing proceeds to block 814 for the final calculations. If time available is expressed as time available in hours (TH), then this value is multiplied by 60 at block 816. If the time available is expressed in seconds (TS), then that value is divided by 60 at block 818 to arrive at time available expressed in minutes (TM).

In any of the above cases, once the unit conversion is accomplished in the process of FIG. 8, units per hour (UH) are calculated at block 814. In this example, demand per day is multiplied by 60, with the result divided by time available in minutes (TM). Takt is often expressed in seconds. Thus, 3600 is divided by the number of units per hour at block 820 to obtain takt. Finally, the units per hour and the takt are displayed at block 822. As previously discussed, and as will be shown further with respect to FIG. 9, the results of the calculations performed by process 800 of FIG. 8 can also be saved in a media or to a data store.

Figure 9:
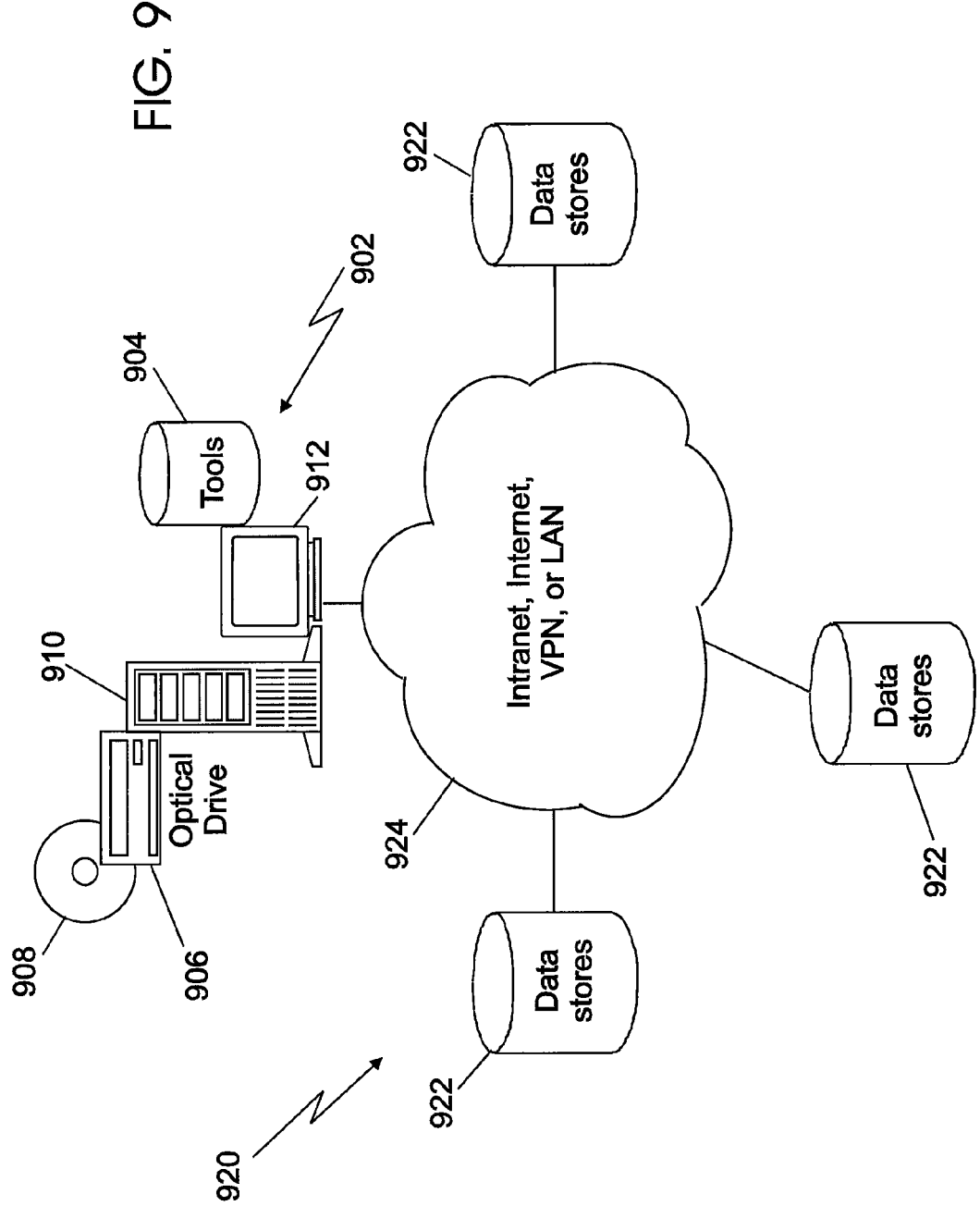
FIG. 9 is a system block diagram according to example embodiments of the invention.

FIG. 9 illustrates a typical operating environment for embodiments of the present invention. FIG. 9 actually illustrates two alternative embodiments of a system implementing the invention. System 902 can be a workstation or personal computer. System 902 can be operated in a "stand-alone" mode. The system includes a fixed storage medium, illustrated graphically at 904, for storing programs and/or macros which enable the use of an embodiment of the invention. In a stand-alone implementation of the system, fixed storage 904 can also include saved output data, such as results or outputs from the various software tools, and saved input data. In this particular example, an optical drive, 906, is connected to the computing platform for loading the appropriate computer program product into system 902 from an optical disk, 908. The computer program product includes a computer program or programs with instructions or code to aid in carrying out the methods of the invention. Instruction execution platform 910 of FIG. 9 can execute the appropriate instructions and display appropriate screens on display device 912. These screens can include user input screens for the various system tools previously discussed.

FIG. 9 also illustrates another embodiment of the invention in which case the system 920, which is facilitating the use of the invention, includes a connection to data stores 922, from which data can be read, and to which output data such as results can be saved for future reference. The connection to the data stores or appropriate databases can be formed in part by network 924, which can be an intranet, virtual private network (VPN) connection, local area network (LAN) connection, or any other type of network resources, including the Internet.

A computer program which implements some or all of the tools used with an embodiment of the invention through the use of systems like those illustrated in FIG. 9 can take the form of a computer program product residing on a computer usable or computer readable storage medium. Such a computer program can be an entire application, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network. Note that the computer usable or computer readable medium could even be paper or another suitable medium upon which the program is printed, as the program can then be electronically captured from the paper and then compiled, interpreted, or otherwise processed in a suitable manner.

Specific embodiments of an invention are described herein. One of ordinary skill in the process management arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

What is claimed is:

1. A method of operationalizing process excellence comprising:
   characterizing, via a computing device processor, a former process using a plurality of lean tools including at least a cost-of-poor-process (COPPO) tool, a takt-o-meter, and an operating efficiency model;
   characterizing, via a computing device processor, a future process using the plurality of lean tools including at least the COPPO tool, the takt-o-meter, and the operating efficiency model; and
   providing a comparative evaluation of the future process relative to the former process using results from the plurality of lean tools including the COPPO tool; the takt-o-meter, and the operating efficiency model.

2. The method of claim 1 further comprising: carrying out pre-work to the characterizing of the former process.

3. The method of claim 1 further comprising executing, via a computing device processor, implementation and control activities based on the characterizing of the former and future processes to create a continuous improvement productivity loop.

4. The method of claim 2 further comprising executing, via a computing device processor, implementation and control activities based on the characterizing of the former and future processes to create a continuous improvement productivity loop.

5. The method of claim 1 wherein the plurality of lean tools further includes at least one of an employee opinion survey, an unresolved rate model, and a skills matrix.

6. The method of claim 2 wherein the plurality of lean tools further includes at least one of an employee opinion survey, an unresolved rate model, and a skills matrix.

7. The method of claim 3 wherein the plurality of lean tools further includes at least one of an employee opinion survey, an unresolved rate model, and a skills matrix.

8. The method of claim 4 wherein the plurality of lean tools further includes at least one of an employee opinion survey, an unresolved rate model, and a skills matrix.

9. Apparatus to facilitate operationalizing process excellence, the apparatus comprising:
   a processor;
   a memory in commincation with the processor;
   an instruction execution platform stored in the memory, executable by the processor and configured to characterize a former process and a future process using a plurality of lean tools including at least a cost-of-poor-process (COPPO) tool, a takt-o-meter, and an operating efficiency model; and
   a data store stored in the memory, operatively connected to the instruction execution platform and configured to supply historical data and store results from the plurality of lean tools to enable comparative evaluation of the future process relative to the former process using the results.

10. The apparatus of claim 9 further comprising a network operatively connecting the instruction execution platform to the data store.

11. The apparatus of claim 9 wherein at least one of the plurality of lean tools is implemented by a spreadsheet.

12. The apparatus of claim 10 wherein at least one of the plurality of lean tools is implemented by a spreadsheet.

13. The apparatus of claim 9 wherein the plurality of lean tools further includes at least one of an employee opinion survey, an unresolved rate model, and a skills matrix.

14. The apparatus of claim 10 wherein the plurality of lean tools further includes at least one of an employee opinion survey, an unresolved rate model, and a skills matrix.

15. The apparatus of claim 11 wherein the plurality of lean tools further includes at least one of an employee opinion survey, an unresolved rate model, and a skills matrix.

16. The apparatus of claim 12 wherein the plurality of lean tools further includes at least one of an employee opinion survey, an unresolved rate model, and a skills matrix.

17. Apparatus to facilitate operationalizing process excellence, the apparatus comprising:
   means for characterizing a former process using a plurality of lean tools including at least a cost-of-poor-process (COPPO) tool, a takt-o-meter, and an operating efficiency model;
   means for characterizing a future process using the plurality of lean tools including at least the COPPO tool, the takt-o-meter, and the operating efficiency model;
   means for storing results from the plurality of lean tools to enable comparative evaluation of the future process relative to the former process using the results; and
   means for operatively connecting both of the means for characterizing and the means for storing.

18. The apparatus of claim 17 wherein the plurality of lean tools further includes at least one of an employee opinion survey, an unresolved rate model, and a skills matrix.

* * * * *